G. W. GWINN.
AUTOMATIC WEIGHING MECHANISM.
APPLICATION FILED JULY 8, 1909.

1,020,692.

Patented Mar. 19, 1912.

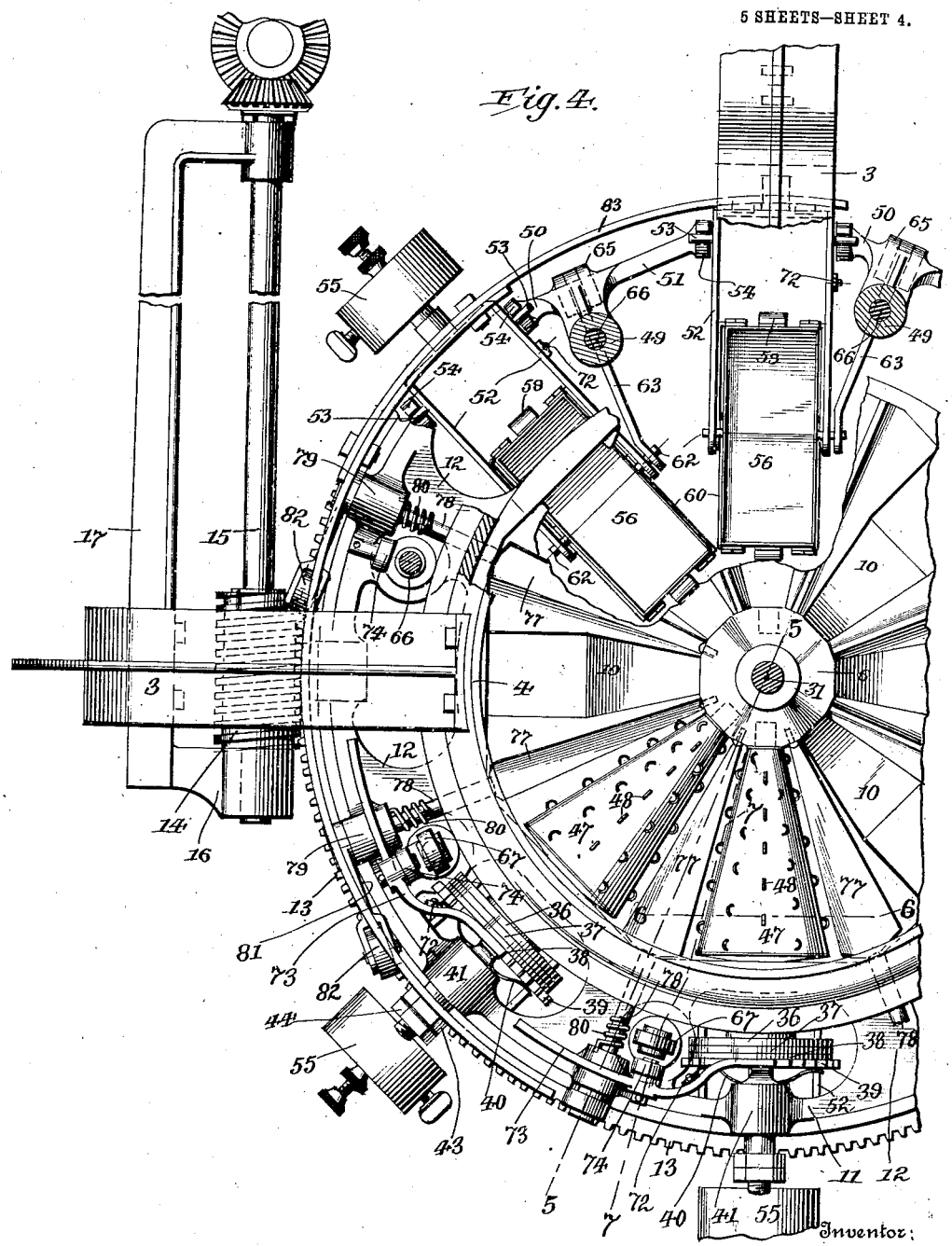

G. W. GWINN.
AUTOMATIC WEIGHING MECHANISM.
APPLICATION FILED JULY 8, 1909.
1,020,692.
Patented Mar. 19, 1912.
5 SHEETS—SHEET 5.
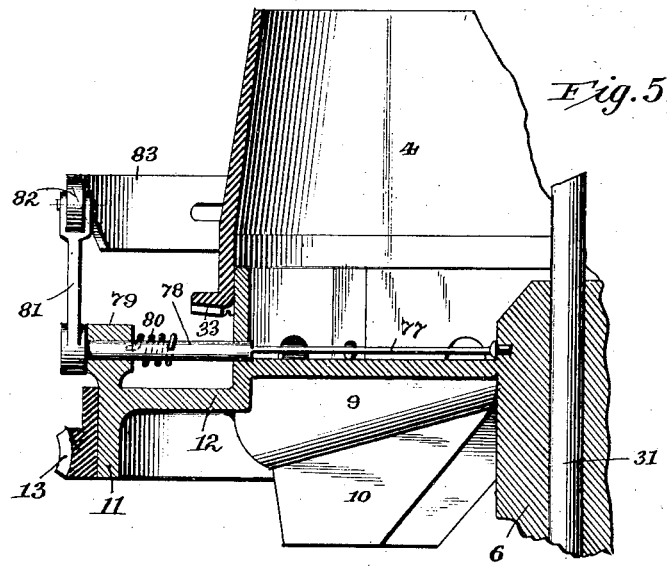
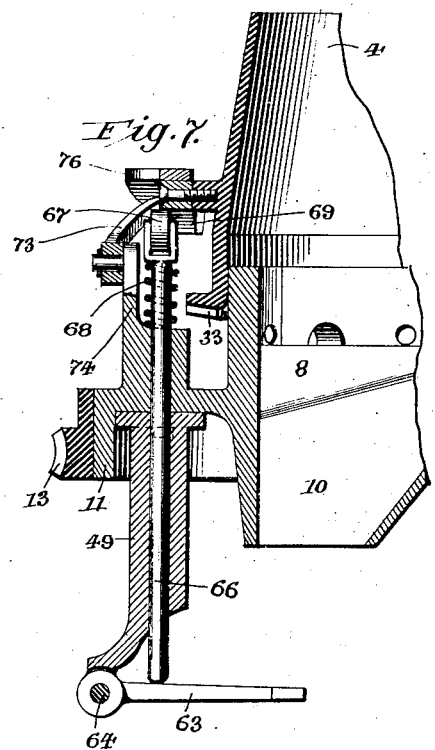
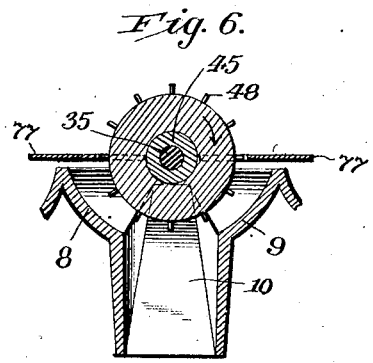

UNITED STATES PATENT OFFICE.

GEORGE W. GWINN, OF NEW YORK, N. Y., ASSIGNOR TO AUTOMATIC PACKING & LABELING COMPANY, OF DURHAM, NORTH CAROLINA, A CORPORATION OF NORTH CAROLINA.

AUTOMATIC WEIGHING MECHANISM.

1,020,692.　　　　　　Specification of Letters Patent.　　Patented Mar. 19, 1912.

Application filed July 8, 1909. Serial No. 506,580.

*To all whom it may concern:*

Be it known that I, GEORGE W. GWINN, a citizen of the United States, residing at New York, in the county of New York and State of New York, have invented certain new and useful Improvements in Automatic Weighing Mechanism, of which the following is a specification.

Figure 1:
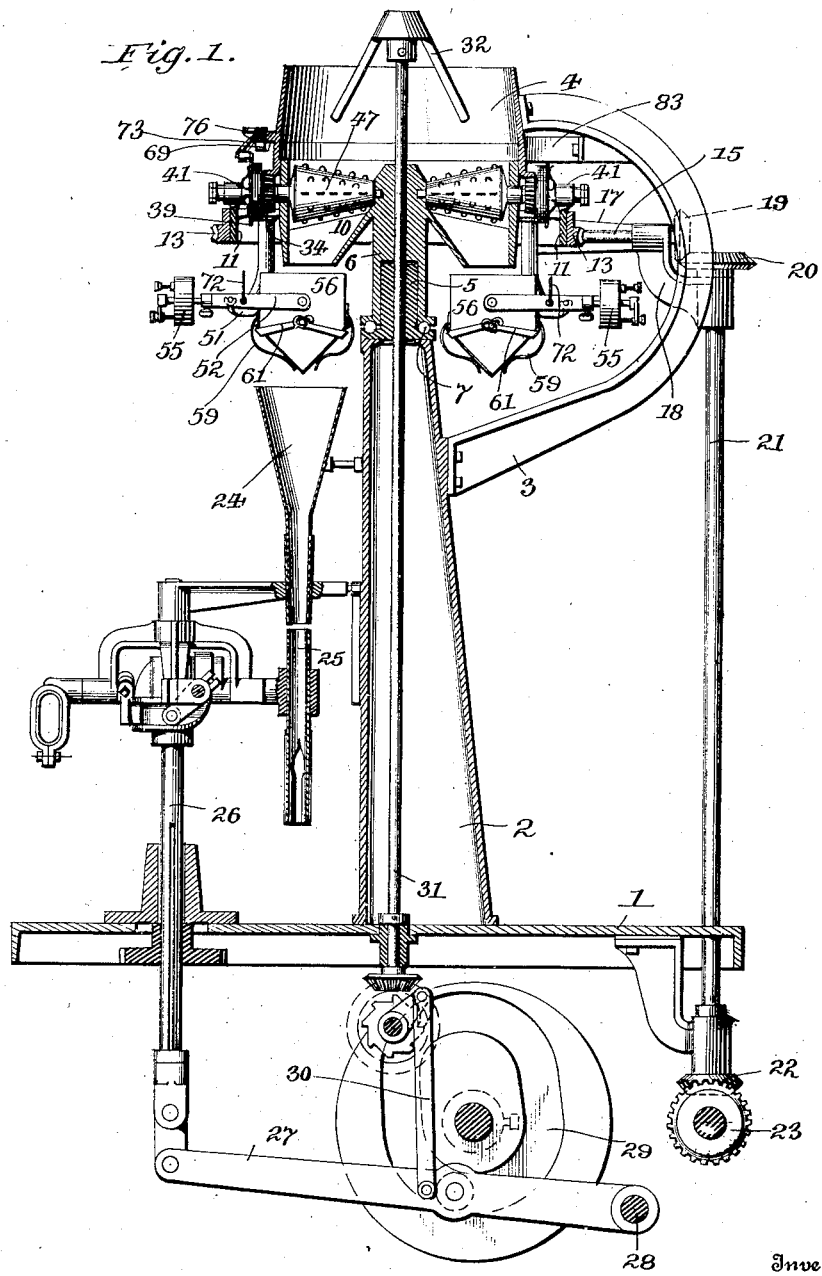
Figure 2:
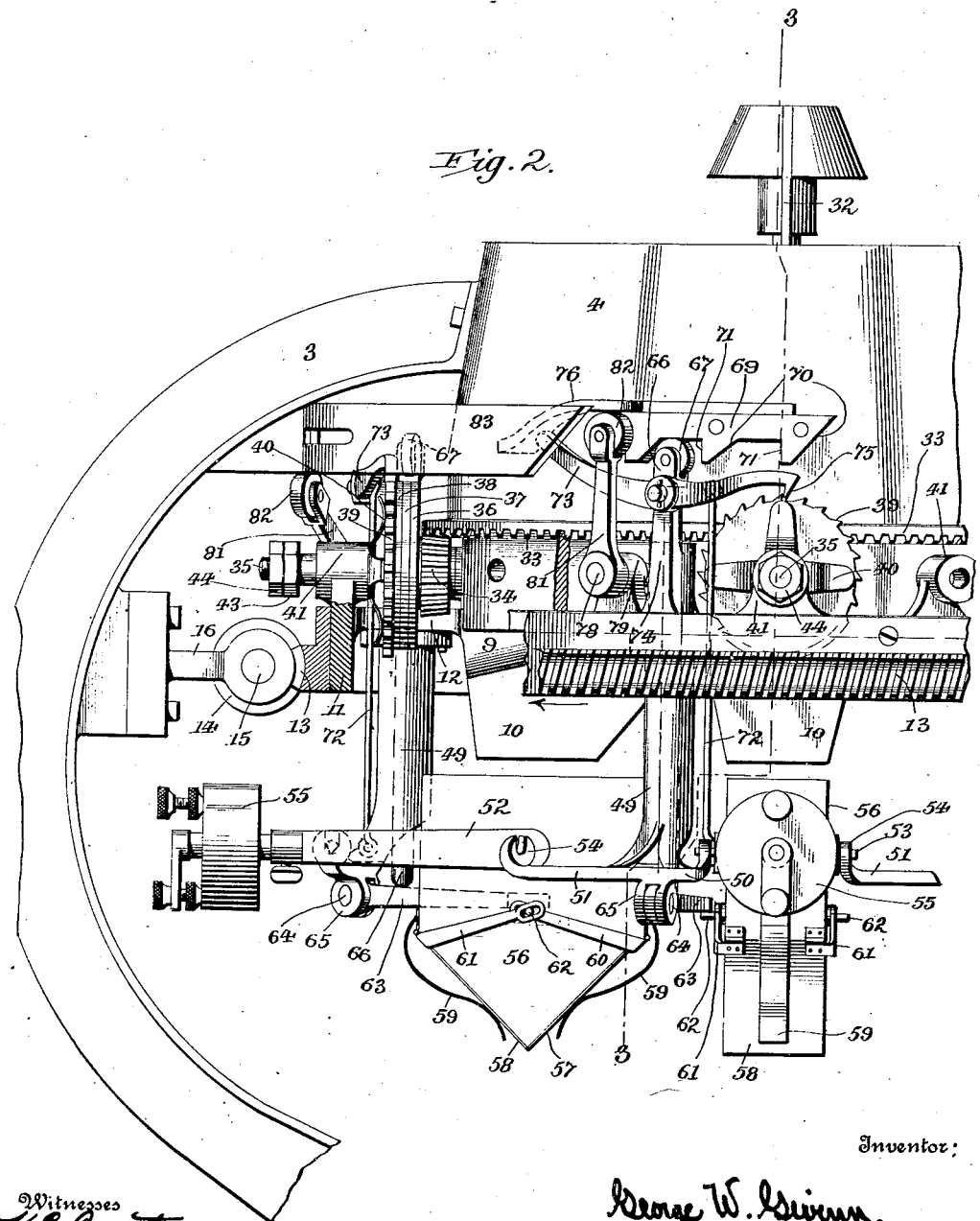
Figure 3:
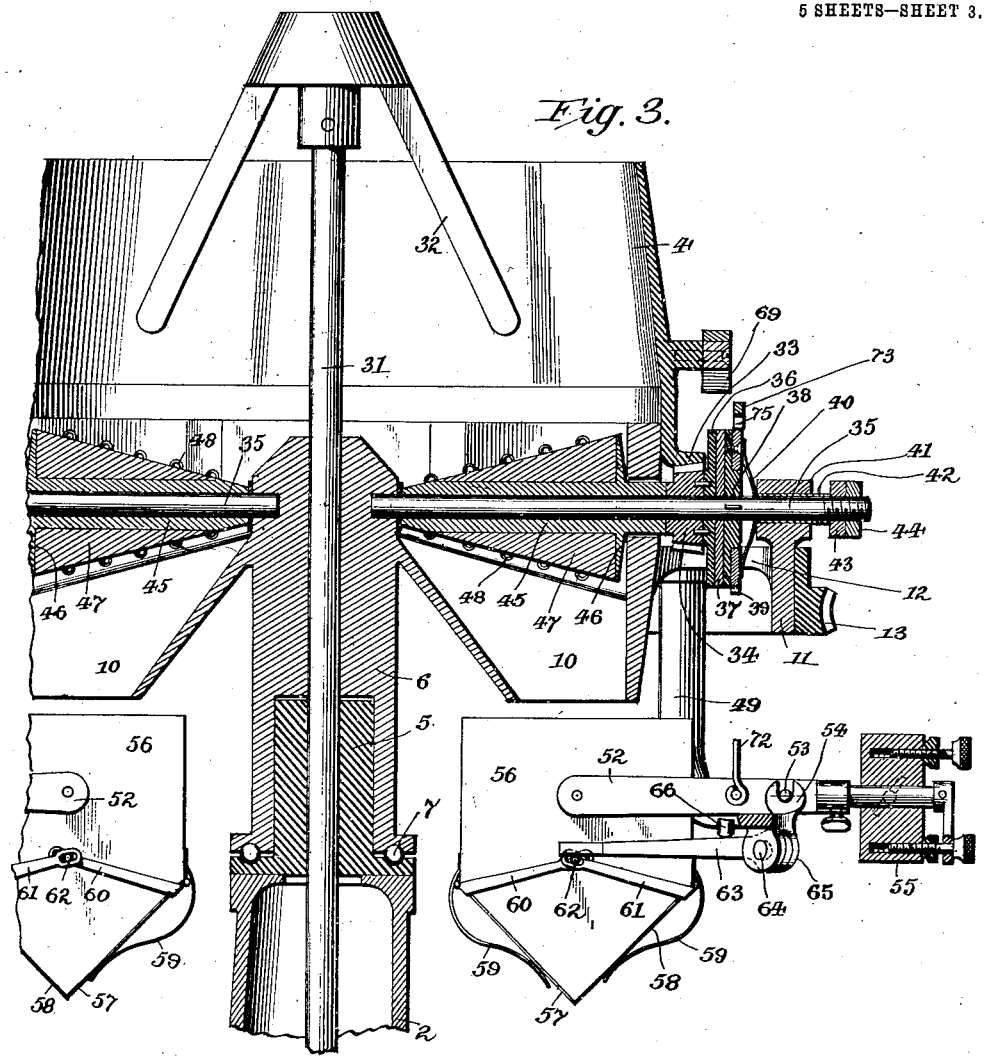

My present invention pertains to an improved automatic weighing mechanism, the construction and advantages of which will be hereinafter set forth, reference being had to the annexed drawings, wherein:

Figure 1 is a vertical sectional view of the mechanism shown in connection with a portion of a machine for packaging material; Fig. 2 an enlarged sectional elevation of a portion of the weighing mechanism; Fig. 3 a vertical sectional view, taken on the line 3—3 of Fig. 2; Fig. 4 a sectional plan of the mechanism, the lower portion of the figure being a plan view and the upper portion being shown in section in several different planes; Fig. 5 a detail vertical sectional view, taken on the line 5—5 of Fig. 4, and designed to illustrate one of the gates or valves which work in conjunction with the feed rolls and serve to cut off the supply of material to said rolls when the approximate charge has been fed into the scale-pans and likewise the mechanism by which said gate or valve is operated; Fig. 6 a vertical sectional view, taken on the line 6—6 of Fig. 4, illustrating the relation of the valves or gates to the feed rolls; and Fig. 7 a vertical sectional view, on the line 7—7 of Fig. 4, illustrating the mechanism by which the bottom of the scale-pan is opened.

The construction herein set forth is an improvement upon the weighing mechanism disclosed in United States Letters Patent No. 860,392, granted to George A. Lee under date of July 16, 1907, and is designed to secure a more accurate weighing of the material and to do away with the large hopper or receptacle (as B) in said patent, into which the scale-pans successively discharge. Under the present construction the scale-pans are brought successively into alinement with the funnel which stands directly over the bag-holding device, at which point the pan is opened and the contents thereof discharged into the funnel.

The present case has also for its object the provision of means whereby the use of the ordinary dribble roll is rendered unnecessary, and a valve or gate is employed in conjunction with the main feeding roll to limit the discharge of the material into the scale-pans as the weight of the full charge is approximated.

A still further object of the invention is to provide means whereby the bottom of each scale-pan will be successively opened and closed while the pan is over the funnel or other receptacle into which the charge is discharged, whereby the bottom of the pan will be jarred and the material which adheres to the scale-pan will be removed and the full discharge thereby insured.

With these and other objects in view, a detailed description of the invention will be given, reference being had first to Fig. 1, wherein 1 denotes the bed or table, from which extends a vertical column 2, upon which the weighing mechanism is supported. A series of U-shaped brackets 3 are secured to the column and form the support for a fixed hopper or receptacle 4 into which the material to be weighed is discharged from a suitable source. To the upper end of the column is secured a bearing-block or post 5, adapted to receive and sustain the downwardly-projecting hub 6 of the casting which supports the weighing mechanism proper. In order to avoid undue friction between the parts, and to facilitate the rotation of the hub 6, balls 7 will be interposed between the projecting flange of the hub and the block 5, as clearly illustrated in Figs. 1 and 3. The casting just referred to is provided with a series of radially-disposed pockets extending outwardly from the central hub 6, each of said pockets being formed by the downwardly and inwardly inclined walls 8 and 9 (see Fig. 6) the lower margins of said walls inclining downwardly from the central hub toward the outer portion of the pocket at an angle corresponding to that of the face of the feed roll hereinafter referred to. A spout 10 opens into the lower portion of each of said pockets or chambers and the inner wall of the spout is inclined, as best shown in Fig. 3, so that the material which is fed from said chamber through the spout will be delivered into the scale-pan which is located directly below the mouth of the spout.

A ring-shaped member 11 is formed as an integral portion of the casting, being connected by a web 12 to the main body of the casting, and secured to the outer face of said ring-shaped member is a worm-rack 13, a worm 14 (Fig. 4) meshing therewith and serving as the worm is rotated to impart a continuous rotary motion to the rack and the casting to which it is attached. The worm is mounted upon a shaft 15 (Figs. 1, 2 and 4), said shaft being supported at one end by a bracket 16, extending outwardly from an arm or horizontally-disposed supporting member 17, to the opposite end of which is secured a bracket 18. A bevel-gear 19 is secured to the outer end of the shaft 15, said gear meshing with a similar gear 20 mounted upon the upper end of a shaft 21, which is driven through gears 22 and 23 from any suitable source of power which will impart a continuous motion to said shaft. Thus it will be seen that the casting or member which supports the weighing mechanism is constantly rotating, and the scale-pans are brought successively over the funnel 24, which is located above a bag-holder 25, shown in Fig. 1. Any form of bag-holder for the bag or like container may be employed, that shown forming part of my application filed on or about the eighth day of July 1909, Serial No. 506,581 and therein specifically claimed. Said bag-holding mechanism is carried upon a shaft 26, to which rotary and longitudinal movement is imparted through a lever 27, fulcrumed at 28, said lever being operated by a cam 29. A link 30 extends upwardly from the lever 27, and through suitable pawl-and-ratchet mechanism imparts a step-by-step rotary motion to a shaft 31, the lower end of which is secured in a suitable bearing carried by the table, the shaft extending upwardly through the column 2, the block 5, hub 6 and terminating at a point slightly above the hopper or receptacle 4.

A stirrer 32 is secured to the upper end of the shaft 31, the fingers of said stirrer extending down into the hopper and tending, as the shaft is rotated, to break up the material therein so that the feed rolls may cause the same to be readily discharged into the scale-pans.

The scale-pans, feed rolls, the means for arresting the movement of the feed rolls when the full charge has been delivered to the pans, and the means for opening the pans and causing the discharge of the material into the funnel or the like, are the same throughout, and a description of one set of said mechanisms will, therefore, suffice, there being eight sets of such mechanisms employed in the construction shown.

The under face of the depending skirt of the hopper is provided with a continuous rack 33, with which mesh the pinions 34 which are employed to actuate the various feed rolls. Each of said pinions 34 is loosely mounted on a shaft 35 (see Fig. 3) and has pinned thereto a friction disk 36, which disk bears against a leather disk 37, which in turn bears against a metallic disk 38, said latter disk being splined to the shaft 35 so as to rotate therewith but have a slight movement in line with the axis of the shaft. The disk 38 has secured to it or formed integral therewith a member provided with a series of teeth, as 39, upon its periphery, and a dished spring washer or plate 40. Extending upwardly from the ring-shaped member 11 is a lug or projection 41 in which is mounted a sleeve or liner 42, said sleeve forming the support for the outer end of the shaft 35, which extends through said sleeve and to a point beyond the same. Said outer end is threaded and provided with two nuts 43 and 44 by which the sleeve or liner 42 may be moved inwardly with reference to the shaft and place the spring disk under greater tension.

Loosely mounted upon the shaft 35, within the pocket or chamber and over the spout 10, is a conical feed-roll composed of a hub 45 provided with an outwardly-extending flange or head 46 which contacts with the outer wall of the pocket or chamber and thus prevents endwise movement of the shaft when the sleeve or liner 42 is being adjusted. Mounted upon the hub 45 is a tapered section 47 which is provided with a series of fingers or staple-shaped members 48 which, as will be readily appreciated, take hold of the material and carry it downwardly toward the spout 10 as the roll is rotated. The inner end of the shaft 35 finds its bearing in the central hub 6.

Extending downwardly from the web 12 is a series of hollow posts 49, each post being provided at its lower end with laterally-projecting arms 50 and 51, best shown in Fig. 4. As will be noted upon reference to said figure, the arm 50 is a short arm and the arm 51 is a long arm. The adjacent ends of the arm 50 and the arm 51 of the next adjacent post are spaced apart so as to receive between them a yoke-shaped scale-beam 52. Said beam is provided with outwardly-extending fingers 53, preferably provided with knife-edges which rest in seats or sockets formed in upwardly-projecting lugs 54 formed upon the arms 50 and 51. The outer end of the beam carries a suitable adjustable weight 55, designed to counterbalance the weight of the pan 56 and its allied parts. Said pan is pivotally supported between the arms of the scale-beam. The pan is provided at its lower end with two doors or flaps 57, 58 normally held in their closed position by springs 59 which contact with said doors. Arms 60 and 61 extend inwardly from the doors 57, 58 adjacent to their hinges or pivotal connection, the arms overlapping and being provided with a pin-and-slot connection, the pin 62 (see Fig. 4) extending outwardly beyond the face of the arm and beneath a third arm or lever 63, fulcrumed upon a pin 64 secured in a pair of ears 65 extending downwardly from the arms 50 and 51.

A rod 66 is mounted in the vertical post 49, said rod resting at its lower end upon the upper face of the lever 63 (see Fig. 7) and carrying at its upper end a roller 67, the rod being held in its normally elevated position by a spring 68 which encircles the upper end of the rod below the yoke which carries the roller. Said roller stands in alinement with a stepped cam 69 secured to the outer face of the hopper 4, said cam being located in such relation to the funnel 24 as to cause the rod 66 to be moved downwardly and to open the doors 57, 58 of the scale-pan through the connections before described when the pan comes into position over said funnel.

By reason of the stepped construction of the cam (said cam being formed with a series of inclined faces 70 and a series of vertically-disposed faces 71 so that a space is left between each of the straight faces and the next adjacent inclined face) the rod will be moved upwardly and downwardly and will cause the doors 57 and 58, acting in conjunction with the springs 59, to be opened and closed three times before the scale-pan moves out of alinement with the funnel 24. This opening and closing of the doors jars the pan and the doors so as to free the parts of any adhering material which might otherwise remain in the pan and thus cause a shortage in the package which was then being filled.

The feed roll, as will be seen upon reference to Fig. 3, extends throughout the length of the pocket or chamber in which it is located, and continues to rotate until such time as the movement of the disk 38 is arrested. The stopping of the movement of this disk, of course, brings the shaft 35 to rest and consequently prevents further rotation of the roll. To effect this stopping there is secured to the scale-beam 52 a draw-rod 72 (see Fig. 2) the upper end of said rod being connected to a lever 73 fulcrumed upon an upwardly-extending post 74. One end of the lever, or that adjacent to the connection with the draw-rod 72, is provided with a tooth 75, adapted to coact with the teeth 39 of the member carried by the disk 38.

As the scale-pan descends, by reason of its having received a full charge, the rod 72 will be drawn down and consequently the lever 73 will be rocked and the tooth 75 brought into contact with the teeth 39 carried by the disk 38, and further movement of said disk will be prevented. The pinion 34 and its friction disk 36 may, however, continue to rotate, but no motion will be imparted to the shaft 35 thereby.

The feed roll will be held at rest until the scale-pan has been discharged, and after the pan is moved away from over the funnel 24 the end of the lever 73 comes into contact with a cam 76 (Fig. 2) mounted upon the hopper or receptacle 4, thereby rocking the lever and disengaging the tooth 75 from the tooth 39 carried by the disk 38. Thus the shaft 35 will be unlocked and the frictional drive will be reëstablished between the pinion 34 and the shaft.

In order to effect the proper feeding of the requisite quantity of material from the hopper into the pan, means is provided whereby the opening from the hopper into the pocket or chamber in which the feed-roll works may be closed as the load nears its requisite weight. Located between each pair of rolls at a point just above the pocket is a valve or tilting plate 77, shown in detail in Figs. 4, 5 and 6. Said plate is so shaped (see Fig. 4) as to occupy the space between the adjacent rolls when the plate or valve is brought to a horizontal position. The inner end of the plate finds its bearing in the central hub 6 and extending outwardly from the outer end of the valve is a stem or shaft 78, the outer end of which is supported in a boss or lug 79. A spring 80 secured to the boss and to the shaft serves to normally bring the valve to a horizontal position or to that position where it will tend to retard the feed of the material by the roll. To the outer end of the shaft or stem 78 is secured an arm 81, said arm carrying at its free end a roller 82 adapted to contact with a cam 83 supported by the brackets 3. Said cam extends from a point adjacent to the point of discharge of the pans into the funnel 24 to nearly half way around the hopper and thus the plates or valves 77 are held in their open or upright position while the roller 82 is in contact with the cam. During this period the feed roller is free to carry the material from the hopper through the pocket and into the spout 10 to the full extent. When, however, the roller 82 passes from beneath the cam the spring 80 serves to bring the valve to its horizontal position, cutting off free access of the material from the hopper into the pocket and permitting the feeding of the material only through the restricted space between the edge of the valve and the outer face of the roller or through a narrow slot or opening. This causes a gradual feed of the material, brings the charge gradually up to the maximum and prevents overweight. The valves remain in their closed position until the pan has been discharged and the doors 57 and 58 are again closed.

The frame or casting, which comprises the central hub 6, the various pockets and spouts, the web 12 and the ring-shaped member 11, may be termed the supporting frame.

Having thus described my invention, what I claim is:

1. In a weighing mechanism, the combination of a hopper; a supporting frame located below said hopper; a plurality of scale-pans suspended from said supporting frame; means carried by the frame for feeding the material to be weighed from the hopper to the pans; means for rotating said frame; and connections intermediate the hopper and the feeding means to cause the feeding means to function as the supporting frame is rotated.

2. In a weighing mechanism, the combination of a fixed hopper; a supporting frame located beneath the hopper; means for rotating said frame; a plurality of scale-pans located beneath the frame; a plurality of feed-rolls carried by the frame adapted to feed the material to be weighed from the hopper to the pans; connections intermediate the hopper and the rolls, to cause the same to rotate as the frame is rotated; means for arresting the movement of any particular roll when its scale-pan has received the requisite amount of material; and means for automatically opening said pan to discharge the material.

3. In a weighing mechanism, the combination of a hopper; a supporting frame located beneath the same, said frame being provided with a series of pockets; means for rotating said frame; a plurality of rolls mounted in said frame, one for each of the pockets; a scale-pan located beneath each of said rolls; means for rotating said rolls as the frame is rotated; means for arresting the movement of one of said rolls; and means for discharging its scale-pan when the frame has reached a predetermined point and the feed-roll comes to rest.

4. In a weighing mechanism, the combination of a fixed hopper; a supporting frame located beneath the same, said frame being provided with a series of pockets; means for rotating said frame; a plurality of rolls carried by said frame, each of said rolls working in one of the pockets or chambers formed in said frame; a scale-pan located below each of said pockets and adapted to receive the material discharged by the roll; means for driving said rolls as the frame is rotated; means actuated by the pan to arrest the movement of the roll when the pan has received a definite charge; and means for opening said pan when the frame reaches a predetermined point in the path of its travel.

5. In a weighing mechanism, the combination of a hopper; a supporting frame located beneath the same and provided with a series of pockets; means for rotating said frame; a plurality of feed-rolls carried by the frame, one roll working in each pocket; a scale-pan situated beneath each of said rolls, adapted to receive the charge of material fed downward by said roll; means for arresting the movement of each of said rolls when its pan has received a definite charge; and means for quickly opening and closing said pan a number of times as it passes a predetermined point in the path of travel of the frame.

6. In a weighing mechanism, the combination of a fixed hopper; a supporting frame located beneath the same, said frame being provided with a pocket; a feed-roll mounted in said pocket; a supporting shaft for said feed-roll extending outwardly from the frame; frictional driving connections between said shaft and the fixed hopper; means for rotating the frame; a scale-pan; and operative connections between said pan and the frictional driving mechanism, for arresting said mechanism when the pan has received a definite charge of material.

7. In a weighing mechanism, the combination of a fixed hopper; a frame rotatably mounted beneath the same, said frame being provided with a series of pockets; means for rotating said frame; a circular rack mounted upon the lower portion of the hopper; a series of shafts carried by the frame, one in line with each of the pockets; a feed-roll loosely mounted upon each of said shafts; a pinion likewise mounted upon each of said shafts, each of said pinions meshing with the circular rack; a toothed member splined to the shaft; frictional driving connections between said member and the pinion; a scale-pan located beneath each of said pockets; and connections between said pan and the toothed member adapted to arrest the rotation of said toothed member when the pan has received a fixed or definite charge.

8. In a weighing mechanism, the combination of a fixed hopper; a supporting frame located beneath the same, said frame being provided with a plurality of pockets; means for rotating said frame; a plurality of shafts mounted in said frame, each shaft being in line with one of the pockets formed in the frame; a circular rack carried by the hopper; a pinion loosely mounted upon each shaft; a toothed member splined to the shaft and movable thereon; a friction driving member secured to the pinion; a spring serving to force the toothed member into engagement with the frictional member carried by the pinion; a scale-pan located beneath each of the pockets; a lever pivoted upon the same, provided with a tooth adapted to coöperate with the toothed member; connections between said lever and the scale-pan, serving, when the pan has received a definite charge, to draw the lever downward and carry its tooth into contact with the toothed member upon the shaft: and a cam serving to elevate said lever after the contents of the pan has been discharged.

9. In a weighing mechanism, the combination of a supporting frame; a scale-pan carried thereby; and means for imparting to the doors of said pan a series of jars or impacts, whereby any material which may adhere to the pan or the doors will be dislodged.

10. In a weighing mechanism, the combination of a supporting member; a scale-pan carried thereby; means for traversing said supporting member and the pan; a stepped cam; and connections intermediate said cam and the doors of the scale-pan, whereby said doors will be opened and closed in quick succession a number of times and any material which might otherwise adhere to the pan and doors thereby dislodged.

11. In a weighing mechanism, the combination of a supporting frame; a scale-pan carried thereby; means for traversing said frame and pan; a fixed cam having a series of abrupt faces; means for normally holding the doors of the pan closed; and means interposed between said doors and the cam for opening the doors a number of times to permit the same to be suddenly closed when said means comes into alinement with the abrupt portions of the cam.

12. In a weighing mechanism, the combination of a supporting member; a pan carried thereby; means for traversing said supporting member and pan; a fixed cam provided with a series of abrupt faces; springs normally holding the doors of the pan in a closed position; a rod working in conjunction with the cam; and connections between said rod and the doors of the pan, whereby as the rod is depressed the doors will be opened and when the rod is freed the doors will be suddenly thrown to their closed position, thereby imparting a jar or impact to the pan as a whole and serving to dislodge any adhering material.

13. In a weighing mechanism, the combination of a frame provided with a pocket having a single discharge opening; a feed-roll mounted in said pocket; a gate located to one side of the roll, and extending over the pocket, said gate and roll substantially closing the discharge opening, and means for opening and closing said gate, whereby the space through which the material may be drawn by the roll may be restricted.

14. In a weighing mechanism, the combination of a frame provided with a pocket; a feed-roll mounted in said pocket; a gate located to one side of the roll, extending over the pocket; and means for opening and closing said gate whereby the space through which the material may be drawn by the roll may be restricted.

15. In a weighing mechanism, the combination of a frame provided with a pocket; a roll located above said pocket; means for rotating the roll; a valve located to one side of the roll and overlying the pocket; a spring serving normally to hold said valve in its closed position; and a cam acting to open the valve.

16. In a weighing mechanism, the combination of a supporting frame provided with a plurality of pockets; a roll mounted in each of said pockets, the roll being of a width less than that of the pocket; a gate or valve located between each pair of rolls; means for normally holding said gates in their horizontal or closed position; and means for rocking said gates and holding them open for a given period of time, whereby the rolls may feed the material rapidly while the gates are open and slowly after the gates are closed.

17. In a weighing mechanism, the combination of a rotatable supporting frame provided with a plurality of pockets; a feed-roll mounted in each of said pockets; a gate located between each pair of rolls; means for normally holding the gates in their horizontal or closed position; means for rotating the frame; and a cam extending throughout a portion of the travel of the frame, serving to act upon the gates to open the same.

18. In a weighing mechanism, the combination of a rotatable frame provided with a plurality of pockets; means for traversing the frame; a feed-roll mounted in each of the pockets in said frame; a gate located between each pair of rolls; a spring serving to rotate each of said gates to bring it from a horizontal position, whereby the feed of the roll will be restricted; a lever connected to the outer end of each of said gates; and a cam adapted to coöperate with said lever to open the gate.

19. In a weighing mechanism, the combination of a rotatable supporting frame provided with a plurality of pockets; a feed-roll mounted in each of said pockets; means for imparting motion to said roll through the rotation of the frame; a scale-pan located beneath each of said feed-rolls; a valve located between each pair of rolls; a cam serving to open said valves during the initial travel of the frame from the point of discharge from the scale-pan and to permit the valves to close when the frame has traveled a predetermined distance and the scale-pan has been nearly charged; means for arresting the rotation of the roll when the pan has been fully charged; and means for opening the pan when it reaches a predetermined point in the path of travel of the frame.

20. In a weighing mechanism, the combination of a rotatable supporting frame provided with a plurality of pockets; a feed-roll mounted in each of said pockets; means for imparting motion to said roll through the rotation of the frame; a scale-pan located beneath each of said feed-rolls; a valve located between each pair of rolls; a cam serving to open said valves during the initial travel of the frame from the point of discharge from the scale-pan and to permit the valves to close when the frame has traveled a predetermined distance and the scale-pan has been nearly charged; means for arresting the rotation of the roll when the pan has been fully charged; and means for successively opening and quickly closing the pan a number of times when the same has reached the point of discharge.

21. In a weighing mechanism, the combination of a frame provided with a pair of adjacent pockets; a feed roll mounted in each pocket; a gate located between said rolls and overlying the adjacent portions of the pockets; and means for opening and clsoing said gate, whereby the space through which the material may be drawn by the rolls may be regulated.

22. In a weighing mechanism, the combination of a frame provided with a plurality of pockets; a feed roll mounted in each pocket; a gate located between each pair of feed rolls and overlying the adjacent pockets; and means for opening and closing said gates, whereby the space through which the material may be drawn by the rolls may be restricted.

In testimony whereof I have signed my name to this specification in the presence of two subscribing witnesses.

GEORGE W. GWINN.

Witnesses:
R. L. PATTERSON,
M. M. WHEDBEE.